(12) United States Patent
McNamara

(10) Patent No.: US 7,575,166 B2
(45) Date of Patent: Aug. 18, 2009

(54) AUTOMATED TELLER MACHINE

(75) Inventor: Michael R McNamara, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 11/288,779

(22) Filed: Nov. 29, 2005

(65) Prior Publication Data

US 2006/0131408 A1    Jun. 22, 2006

(30) Foreign Application Priority Data

Dec. 17, 2004    (GB)    ................... 0427693.7

(51) Int. Cl.
  *G06Q 40/00* (2006.01)
  *G07D 11/00* (2006.01)
  *G07F 19/00* (2006.01)
  *G06K 7/00* (2006.01)
(52) U.S. Cl. ...................... 235/440; 235/379
(58) Field of Classification Search ................. 235/375, 235/380, 440, 381, 454, 451, 492, 494, 379; 705/43, 75, 39; 340/10.34; 194/206, 207, 194/302, 217
  See application file for complete search history.

(56) References Cited

U.S. PATENT DOCUMENTS

| | | | | | |
|---|---|---|---|---|---|
| 4,221,376 | A | * | 9/1980 | Handen et al. ............... | 271/149 |
| 4,435,243 | A | * | 3/1984 | Azeez et al. ................. | 156/361 |
| 4,494,747 | A | * | 1/1985 | Graef et al. .................. | 271/263 |
| 4,580,040 | A | * | 4/1986 | Granzow et al. ............. | 235/379 |
| 4,822,018 | A | * | 4/1989 | Hain ........................... | 271/3.2 |
| 5,055,670 | A | * | 10/1991 | Milne ...................... | 250/223 R |
| 5,112,040 | A | * | 5/1992 | Johnston et al. ............... | 271/11 |
| 5,172,791 | A | * | 12/1992 | Couvrette .................... | 186/37 |
| 5,201,424 | A | * | 4/1993 | Hain .......................... | 209/534 |
| 5,264,688 | A | * | 11/1993 | Matsuno et al. ............. | 235/480 |
| 5,422,467 | A | * | 6/1995 | Graef et al. .................. | 235/379 |
| 5,534,682 | A | * | 7/1996 | Graef et al. .................. | 235/379 |
| 5,540,425 | A | * | 7/1996 | Graef et al. .................. | 271/225 |
| 5,563,393 | A | * | 10/1996 | Coutts ........................ | 235/379 |
| 5,661,283 | A | * | 8/1997 | Gallacher et al. ........... | 235/379 |
| 5,719,383 | A | * | 2/1998 | Forrest ....................... | 235/379 |
| 5,799,288 | A | * | 8/1998 | Tanaka et al. ................ | 705/43 |
| 5,945,602 | A | * | 8/1999 | Ross ........................... | 73/570 |
| 6,047,261 | A | * | 4/2000 | Siefert ........................ | 705/11 |
| 6,082,615 | A | * | 7/2000 | Cesaire et al. ............... | 235/379 |
| 6,092,629 | A | * | 7/2000 | Bohnert et al. ................ | 186/53 |
| 6,260,758 | B1 | * | 7/2001 | Blumberg .................... | 235/379 |
| 6,264,556 | B1 | * | 7/2001 | Izawa et al. ................... | 463/25 |
| 6,367,695 | B1 | * | 4/2002 | Mair et al. ................... | 235/380 |
| 6,378,770 | B1 | * | 4/2002 | Clark et al. ................. | 235/379 |
| 6,390,367 | B1 | * | 5/2002 | Doig .......................... | 235/436 |

(Continued)

FOREIGN PATENT DOCUMENTS

EP    0 712 087 A3    3/1999

(Continued)

*Primary Examiner*—Daniel Walsh
*Assistant Examiner*—Thien T Mai
(74) *Attorney, Agent, or Firm*—Michael Chan

(57) ABSTRACT

A Self Service Terminal (SST) has a fascia and a plurality of sensors, each sensor being arranged to detect a signal from a user token when said token is brought into proximity of said sensor. Each sensor is associated with a specific SST service, the SST being arranged to provide the associated service when said token in brought into the proximity of one or more of said sensors.

13 Claims, 3 Drawing Sheets

U.S. PATENT DOCUMENTS

| | | | |
|---|---|---|---|
| 6,474,548 B1 * | 11/2002 | Montross et al. | 235/379 |
| 6,484,936 B1 | 11/2002 | Nicoll et al. | |
| 6,581,746 B1 * | 6/2003 | Lundblad | 194/206 |
| 6,628,757 B1 * | 9/2003 | Cannon et al. | 379/67.1 |
| 6,789,795 B2 * | 9/2004 | Kallin et al. | 271/272 |
| 6,796,490 B1 * | 9/2004 | Drummond et al. | 235/379 |
| 6,892,872 B2 * | 5/2005 | Miyashita | 194/302 |
| 6,896,114 B1 * | 5/2005 | Matsumoto et al. | 194/202 |
| 6,957,732 B2 * | 10/2005 | Corrick et al. | 194/206 |
| 6,983,836 B2 * | 1/2006 | Adams et al. | 194/302 |
| 7,004,385 B1 * | 2/2006 | Douglass | 235/379 |
| 2002/0073032 A1 * | 6/2002 | Holmes et al. | 705/43 |
| 2004/0016796 A1 * | 1/2004 | Hanna et al. | 235/375 |
| 2004/0118930 A1 | 6/2004 | Berardi et al. | |
| 2005/0008197 A1 * | 1/2005 | Dennis | 382/115 |
| 2006/0106735 A1 * | 5/2006 | Bartz et al. | 705/75 |

FOREIGN PATENT DOCUMENTS

| | | |
|---|---|---|
| EP | 0 933 733 A2 | 8/1999 |
| EP | 0 977 159 A1 | 2/2000 |
| EP | 1 209 636 A2 | 5/2002 |
| GB | 2 350 457 A | 11/2000 |
| JP | 2004-199445 A | 7/2004 |
| WO | WO 01/17298 A1 | 3/2001 |
| WO | WO 0141089 A1 * | 6/2001 |
| WO | WO 2004/044825 A1 | 5/2004 |

* cited by examiner

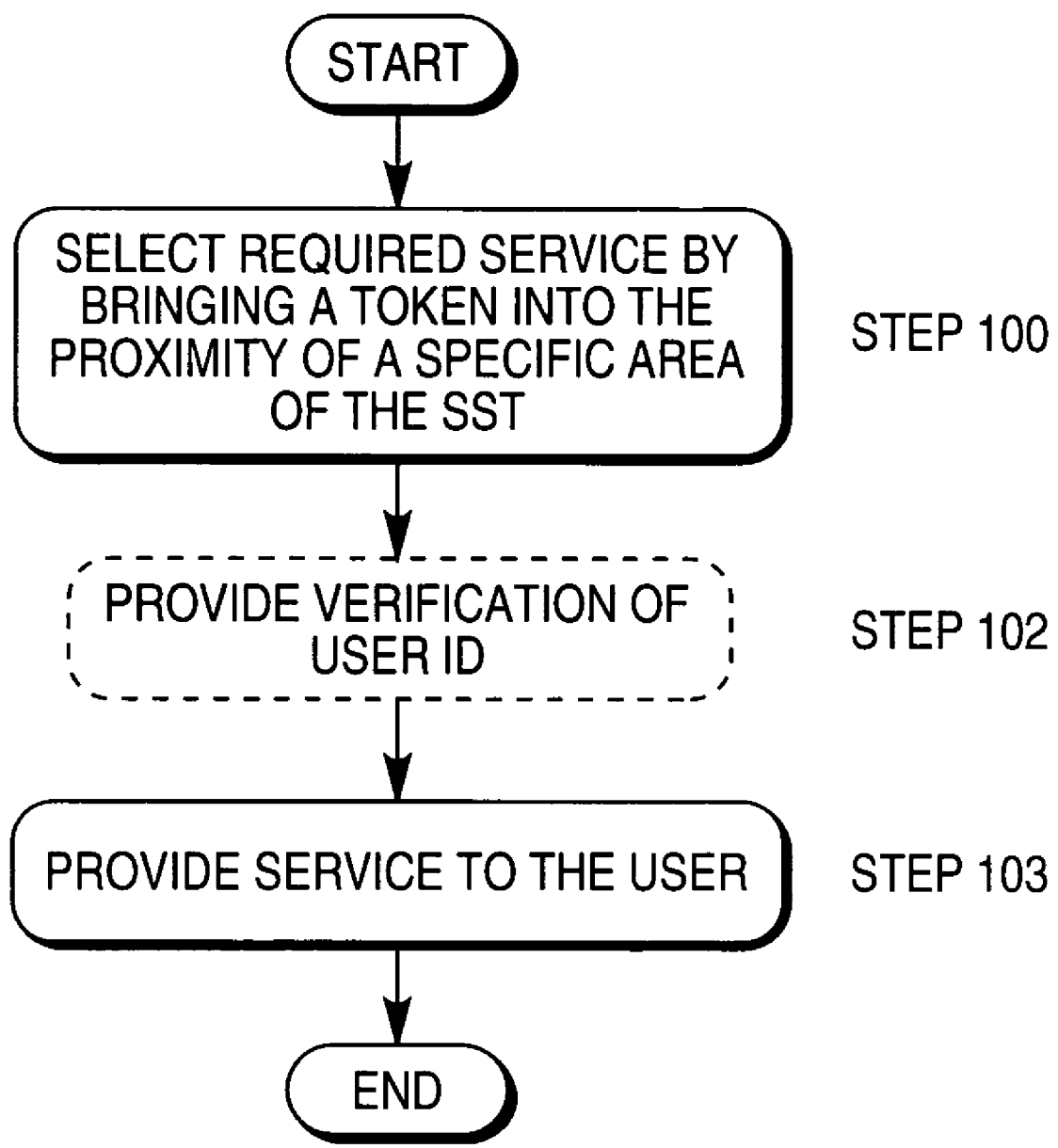

AUTOMATED TELLER MACHINE

The present invention relates to an automated teller machine (ATM) and in particular to a user interface for an automated teller machine.

BACKGROUND OF THE INVENTION

ATMs provide an increasing plurality of services from dispensing cash to loading credits onto mobile phones. However, users of Self Service terminals such as ATMs normally have one thing in common, which is a desire for their interaction with the terminal to be as short as possible.

ATMs have a well documented user interface, as will be described below, including a display screen for providing user's with information and an encrypted PIN pad for receiving user input.

The problem of transaction speed has been addressed in a number of ways in the past. However, in each a user is normally required to identify and verify himself and is required to utilize the standard ATM interface to select the required service.

In addition, specific groups of ATM users such as the disabled may have problems utilizing presently available ATM interfaces. In some cases users can not easily see the information displayed on the display screen and in others users can not easily utilize the encrypted PIN pad. Again these issues have been addressed in the past in a number of ways including providing audio feeds in addition to the display screen. However, it has been more difficult to provide an alternative to the PIN pad for the receipt of user information, although the use of FDKs has made receiving user information somewhat easier

SUMMARY OF THE INVENTION

It is among the objects of an embodiment of the present invention to obviate or mitigate one or more of the above disadvantages.

According to a first aspect of the present invention there is provided a Self Service Terminal (SST) having a fascia and a plurality of sensors, each sensor being arranged to detect a signal from a user token when said token is brought into proximity of said sensor, wherein each sensor is associated with a specific SST service, the SST being arranged to provide the associated service when said token in brought into the proximity of one or more of said sensors.

Preferably, sensors are located at specific points throughout the SST, including the cash dispenser slot, the associated service being the dispensing of cash.

Most preferably, the SST is arranged to dispense a predetermined amount of cash. Alternatively, the SST is arranged to provide the user with an opportunity to input a desired amount of cash.

In one embodiment icons are presented on the fascia and associated with sensors located adjacent the icons, each icon being indicative of an SST service.

Icons may be selected from a list including, but not limited to: a check book, the associated service being the issuance of a new check book; a statement, the associated service being the issuance of an account statement; a bill payment sign, the associated service being the payment of said bill; or a phone, the associated service being the allocation of credit to a user's mobile phone or phone card.

Preferably, each sensor is a non-contact Smart card sensor. Alternatively, each sensor is a short distance RF sensor or a contact Smart card.

In one embodiment the SST includes a biometric user verification system.

According to a second aspect of the present invention there is provided a token for use with an SST as described above.

The token may be a contact or non-contact Smart card or an RFID device.

According to a third aspect of the present invention there is provided an SST System including an SST as described above and a plurality of user token each as described above.

According to a fourth aspect of the present invention there is provided a method of providing a service at a Self Service Terminal (SST), having a fascia and a plurality of sensors located throughout the SST so as to detect a signal from a user token at one or more of said sensors when the token is brought into proximity of said one or more of said sensors, each sensor being associated with a specific SST service, the method comprising; detecting the presence of said token at said one or more of said sensors, determining the service or services required by the user and completing said service or services.

In one embodiment the user is requested to verify their identity prior to the provision of the service.

Preferably, the user verifies their identity by providing a biometric verification. Most preferably, the biometric verification is a fingerprint.

BRIEF DESCRIPTION OF THE DRAWINGS

Embodiments of the present invention will now be described, by way of example, with reference to the accompanying drawings, in which:

FIG. 3 is a flow diagram of the operation of an ATM in accordance with the present invention.

DETAILED DESCRIPTION

Figure 1:
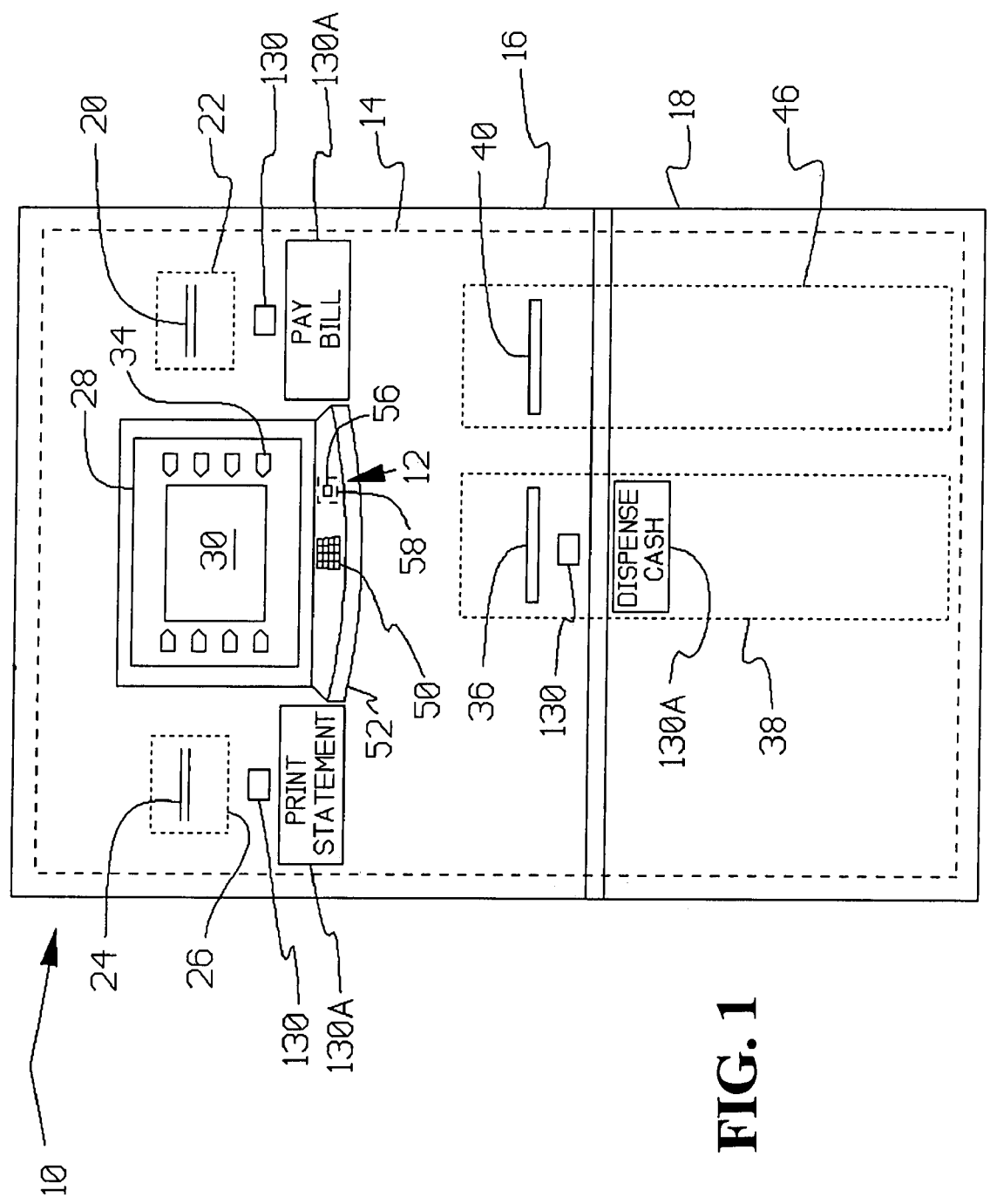
FIG. 1 is a simplified schematic front view of a self-service terminal.
Figure 2:
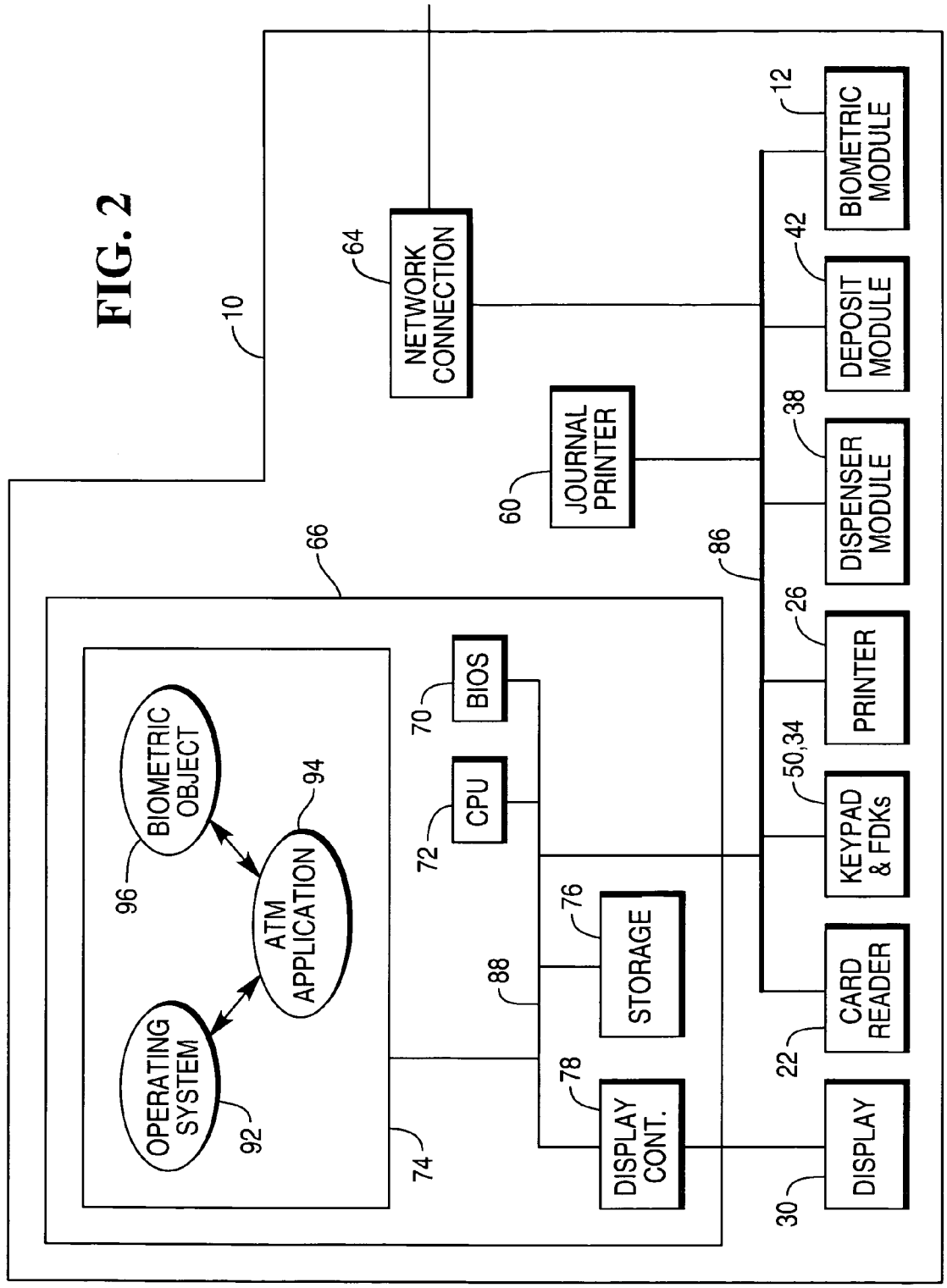
FIG. 2 is a block diagram showing internal modules in the terminal of FIG. 1.

Reference is now made to FIGS. 1 and 2, which show a self-service terminal 10 in the form of an automated teller machine (ATM), which may be operated with a panel in accordance with the present invention. The ATM 10 has a chassis 14 to which is pivotably coupled a plastic fascia 16 covering an upper portion of the chassis 14. A door 18 is hingably coupled to a lower portion of the chassis 14. When the fascia 16 is hinged open and the door 18 is swung open, an operator can gain access to modules located within the ATM 10.

The fascia 16 provides a user interface to allow a user to interact with the ATM 10.

The term "user" in this description is intended to mean a customer who uses the ATM in order to utilize one or more of the services provided by the ATM.

In particular, the fascia 16 has apertures aligning with modules mounted in the chassis 14 when the fascia 16 is pivoted to the closed position. The fascia 16 defines: a card reader slot 20 aligning with a card reader module 22 mounted within the chassis 14; a receipt printer slot 24 aligning with a receipt printer module 26 mounted within the chassis 14; a display aperture 28 aligning with a combined display 30 and associated function display keys (FDKs) 34 mounted as a module within the chassis 14; a dispenser slot 36 aligning with a dispenser module 38 mounted within the chassis 14; and a deposit aperture 40 aligning with a deposit module 42 mounted within the chassis 14.

The fascia 16 also includes an encrypting keypad 50 mounted on a shelf portion 52 extending outwardly from beneath the display aperture 28. The encrypting keypad 50 also receives input from the FDKs 34.

A biometric module 12 is mounted in the shelf portion 52 and includes (i.) a sensor 56 for receiving a human finger and for capturing fingerprint details, and (ii.) an interface 58 for encrypting and relaying a captured fingerprint image. The sensor 56 protrudes through an aperture in the shelf portion 52, and the interface 58 is mounted behind the shelf portion 52. The biometric sensor 56 is a Fingerloc (trade mark) AF-S2 fingerprint sensor, available from Authentec, Inc., P.O. Box 2719, Melbourne, Fla. 32902-2719, U.S.A.

Internally, the ATM 10 also includes a journal printer module 60 for creating a record of every transaction executed by the ATM 10, a network connection module 64 for accessing a remote authorization system (not shown), and a controller module 66 (in the form of a PC core) for controlling the operation of the ATM 10, including the operation of the modules.

The controller 66 comprises a BIOS 70 stored in non-volatile memory, a microprocessor 72, associated main memory 74, storage space 76 in the form of a magnetic disk drive, and a display controller 78 in the form of a graphics card.

The display module 30 is connected to the controller module 66 via the graphics card 78 installed in the controller module 66. The other ATM modules (12, 22, 26, 34, 38, 42, and 50) are connected to the ATM controller 66 via a device bus 86 and one or more internal controller buses 88.

In use, the main memory 74 is loaded with an ATM operating system kernel 92, an ATM application 94, and a biometric capture object 96. As is well known in the art, the operating system kernel 92 is responsible for memory, process, task, and disk management. The ATM application 94 is responsible for controlling the operation of the ATM 10. In normal operation the ATM application 94 provides the sequence of screens used in each transaction (referred to as the transaction flow); monitors the condition of each module within the ATM (state of health monitoring); and obtains authorization for transactions from a remote transaction authorization server (not shown).

The term "screen" is used herein to denote the graphics, text, controls (such as menu options), and such like, that are presented on an SST display; the term "screen" as used herein does not refer to the hardware (that is, the display) that presents the graphics, text, controls, and such like.

Typically, when a transaction is being entered at an ATM, a series of screens are presented in succession on the ATM display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction; and so on.

In addition, and as a secondary means of verification of a user, the biometric capture object 96 receives data from the sensor 56, processes this received data, and forwards the processed data to the ATM application 94 for use in authenticating a user.

The controller 66 (particularly the biometric capture object 96) and the biometric module 12 together comprise a biometric system. The display 30 provides a feedback means for this biometric system.

In contrast, in accordance with the present invention, a user transaction can be conducted as illustrated in FIG. 3. It is clear from FIG. 3 that the user interaction in accordance with the present invention is very much simplified and does not require a plurality of screens to be presented to the user in order to complete the transaction.

The user approaches the ATM and brings their token into contact with a predetermined area of the ATM (step 100). For example, if the user wants to withdraw a predetermined amount of cash (e.g. £50) from the STT then the user will touch the ATM adjacent to the dispenser slot 36. The fascia may have icons thereon which make it easier for the user to identify the area of the ATM to which they should bring their token.

If the user requires another service they simple bring the token into contact with the area of the ATM associated with that service, as discussed above.

Also, it depending on the type of sensor employed it may not be necessary for the user actually to touch the ATM as bringing the toke into the proximity of the area or icon in question may be sufficient.

Optionally, the ATM may require the user to confirm their identity either by entering a PIN as with existing ATMs or by providing a biometric identifier, such as a finger print, (step 102) prior to completing the service.

The ATM will then complete the service (103). Any ATM service can be requested in this way.

The ATM operating software must be adapted to enable this mode of operation and specific preparatory steps must be conducted prior to the operation of the ATM. For example, a user who wishes to have a preset cash amount dispensed each time he uses his token at the ATM, for that service, must register the amount of cash in question. Also, a user must register for the service and a token must be associated with a specific user profile.

Various modifications may be made to the above-described embodiments within the scope of the present invention. In particular, icons can be displayed as screens on the display of the self service device showing different services in different quadrants of the screen. A reader can be located behind each quadrant of the screen. As the user brings their card into close proximity with the quadrant they want the terminal registers the service they want. This would allow the terminal provider to change the services provided on line without physically changing the graphics on the terminal. If the cost of the RFID readers is an issue then the service can be provided through the use of a single reader. The user interface could loop, i.e. different services could be offered through the screen in a sequence. Behind the screen is a contactless reader. As the screen loops through the different services the user swipes when their desired service is being shown. The screen graphics would need to be tied into the reader so that the terminal knew when, and therefore which, service was being requested. This would reduce the cost of providing this type of interaction.

What is claimed:

1. An automated teller machine (ATM) comprising:
    a first device in the form of a cash dispenser and associated with providing a first ATM service in the form of dispensing cash to an ATM customer;
    a second device associated with providing a second ATM service to an ATM customer;
    a fascia having a first predetermined area and a second predetermined area which is different from the first predetermined area;
    a first proximity sensor associated with the first device and disposed at the first predetermined area of the fascia and for (i) receiving a first input signal from a user token when the user token is brought into proximity of the first proximity sensor and (ii) providing a first output signal in response to receiving the first input signal from the user token;

a second proximity sensor associated with the second device and disposed at the second predetermined area of the fascia and for (i) receiving a second input signal from a user token when the user token is brought into proximity of the second proximity sensor and (ii) providing a second output signal in response to receiving the second input signal from the user token; and a controller for (i) monitoring the first and second output signals from the first and second proximity sensors, (ii) executing a first transaction application program to provide a first control signal to control the cash dispenser to dispense cash to an ATM customer in direct response to the first output signal being received from the first proximity sensor and (iii) executing a second transaction application program which is different from the first transaction application program to provide a second control signal to control the second device to provide the second ATM service to an ATM customer in direct response to the second output signal being received from the second proximity sensor.

2. An ATM according to claim 1, wherein the first predetermined area of the fascia comprises an area portion in which a cash dispenser slot is located.

3. An ATM according to claim 1, wherein each of the first and second proximity sensors comprises a non-contact type of sensor.

4. An ATM according to claim 1, wherein each of the first and second proximity sensors comprises a contact type of sensor.

5. An ATM according to claim 1, wherein each of the first and second proximity sensors comprises a short distance radio frequency (RF) type of sensor.

6. An automated teller machine (ATM) comprising:

a fascia having a first predetermined area and a second predetermined area which is different from the first predetermined area;

a first icon located within the first predetermined area of the fascia and associated with a first ATM service;

a second icon different from the first icon and located within the second predetermined area of the fascia and associated with a second ATM service in the form of a dispensing cash to an ATM customer;

a first proximity sensor associated with the first icon and located within the first predetermined area of the fascia and for (i) receiving a first input signal from a user token when the user token is brought into proximity of the first proximity sensor and (ii) providing a first output signal in response to receiving the first input signal from the user token;

a second proximity sensor associated with the second icon and located within the second predetermined area of the fascia and for (i) receiving a second input signal from a user token when the user token is brought into proximity of the second proximity sensor and (ii) providing a second output signal in response to receiving the second input signal from the user token; and a controller for (i) monitoring the first and second output signals from the first and second proximity sensors, (ii) executing a first transaction application program to provide a first control signal to control a device to provide the first ATM service to an ATM customer in response to The first output signal being received from the first proximity sensor and (iii) executing a second transaction application program to provide a second control signal to control a cash dispenser to dispense cash to an ATM customer in direct response to the second output signal being received from the second proximity sensor.

7. An ATM according to claim 6, wherein (i) the first icon comprises a check book icon which is associated with a service of issuing a new check book to an ATM customer and (ii) the first predetermined area of the fascia comprises an area portion in which a check book delivery slot is located.

8. An ATM according to claim 6, wherein (i) the first icon comprises a statement icon which is associated with a service of issuing an account statement to an ATM customer and (ii) the first predetermined area of the fascia comprises an area portion in which a statement delivery slot is located.

9. An ATM according to claim 6, wherein (i) the first icon comprises a bill payment icon which is associated with a service of an ATM customer paying a bill and (ii) the first predetermined area of the fascia comprises an area portion in which a bill payment slot is located.

10. An ATM according to claim 6, wherein (i) the first icon comprises a phone icon which is associated with a service of crediting an ATM customer's phone card and (ii) the first predetermined area of the fascia comprises an area portion in which a phone card slot is located.

11. An ATM according to claim 6, wherein each of the first and second proximity sensors comprises a non-contact type of sensor.

12. An ATM according to claim 6, wherein each of the first and second proximity sensors comprises a contact type of sensor.

13. An ATM according to claim 6, wherein each of the first and second proximity sensors comprises a short distance radio frequency (RF) type of sensor.

* * * * *